United States Patent
Bilinski et al.

(10) Patent No.: US 8,719,602 B1
(45) Date of Patent: May 6, 2014

(54) ENABLING SYSTEM-WIDE POWER USER OPTIONS

(71) Applicant: Google, Inc., Mountain View, CA (US)

(72) Inventors: Brandon Bilinski, San Francisco, CA (US); Jai John Mani, San Francisco, CA (US)

(73) Assignee: Google Inc., Mountain View, CA (US)

(*) Notice: Subject to any disclaimer, the term of this patent is extended or adjusted under 35 U.S.C. 154(b) by 59 days.

(21) Appl. No.: 13/624,472

(22) Filed: Sep. 21, 2012

(51) Int. Cl.
*G06F 1/00* (2006.01)
*H04M 3/493* (2006.01)

(52) U.S. Cl.
USPC ........................................ 713/300; 455/414.2

(58) Field of Classification Search
None
See application file for complete search history.

(56) References Cited

U.S. PATENT DOCUMENTS

| | | | |
|---|---|---|---|
| 8,156,206 B2 | 4/2012 | Kiley et al. | |
| 2007/0281731 A1* | 12/2007 | Attride et al. | 455/550.1 |
| 2011/0320940 A1* | 12/2011 | Tsai | 715/702 |
| 2012/0042006 A1* | 2/2012 | Kiley et al. | 709/203 |

* cited by examiner

*Primary Examiner* — Kim Huynh
*Assistant Examiner* — Vincent Chang
(74) *Attorney, Agent, or Firm* — McDonnell Boehnen Hulbert & Berghoff LLP

(57) ABSTRACT

A computing device, such as a mobile communication device, is provided that enables a user to adjust a power user setting indicative of the user's experience level and/or automatically adjusts the power user setting in response to predetermined conditions. The power user setting may then be provided to or retrieved by applications to adjust the operating mode of the application based on user experience or by web servers to vary content delivery based on user experience.

29 Claims, 4 Drawing Sheets

ENABLING SYSTEM-WIDE POWER USER OPTIONS

TECHNICAL FIELD

This disclosure relates to computing devices such as mobile communication devices and, in particular, to a device that enables a user to adjust a power user setting indicative of the user's experience level and/or automatically adjusts the power user setting in response to predetermined conditions. The power user setting may then be provided to or retrieved by applications to adjust the operating mode of the application based on user experience or by web servers to vary content delivery based on user experience.

BACKGROUND

Developers of software applications for computing devices frequently include various features that are intended for use by more experienced users (e.g., those having a technical background or those having developed experience with the device or application over time). These users, often referred to as power users, are capable of taking advantage of advanced features in the application that a typical user may not use and that enable the power user to accomplish tasks more efficiently or perform more complex tasks than a typical user. Developers generally require that a power user adjust a setting in each application to provide an indication that the user is a power user and to enable the advanced features. As a result, advanced features are not enabled for typical users (i.e., non power users) thereby preventing confusion or compromising the user experience of a typical user and avoiding undue clutter of the user interface.

BRIEF SUMMARY

A computing device in accordance with one embodiment of the present teachings includes a memory configured to store a value for a power user setting. The power user setting is capable of assuming one of a plurality of values including a first value indicative of a less experienced user and a second value indicative of a more experienced user. The device further includes a processor configured to provide an indication to a user of the device of the value of the power user setting stored in the memory. The processor is further configured to receive a request from the user of the device to modify the value of the power user setting and to modify the value of the power user setting stored in the memory responsive to the request. The processor is further configured to execute a plurality of executable instructions to implement an application. The application is configured to operate in a plurality of operating modes including a first mode in which a reduced functionality is made available to the user of the device if the power user setting assumes the first value and a second mode in which an increased functionality is made available to the user of the device if the power user setting assumes the second value. The plurality of executable instructions includes an instruction to retrieve the value of the power user setting for use by the application.

An article of manufacture in accordance with one embodiment of the present teachings includes a computer storage medium having a computer program encoded thereon that when executed by a processor of a computing device causes the processor to change an operating mode of an application. The computer program includes code for providing an indication to a user of the device of the value of a power user setting stored in the memory. The power user setting is capable of assuming one of a plurality of values including a first value indicative of a less experienced user and a second value indicative of a more experienced user. The computer program further includes code for receiving a request from the user of the device to modify the value of the power user setting and modifying the value of the power user setting stored in the memory responsive to the request. The computer program further includes code for retrieving the value of the power user setting from the memory for use by the application. The application is configured to operate in a plurality of operating modes including a first mode in which a reduced functionality is made available to the user of the device if the power user setting assumes the first value and a second mode in which an increased functionality is made available to the user of the device if the power user setting assumes the second value.

An article of manufacture in accordance with another embodiment of the present teachings includes a computer storage medium having a computer program encoded thereon that when executed by a processor of a computing device causes the processor to enable variation in delivery of content from a web server to the computing device over a telecommunications network. The computer program includes code for providing an indication to a user of the device of the value of a power user setting stored in a memory. The power user setting is capable of assuming one of a plurality of values including a first value indicative of a less experienced user and a second value indicative of a more experienced user. The computer program further includes code for receiving a request to modify the value of the power user setting and modifying the value of the power user setting stored in the memory responsive to the request. The computer program further includes code for generating a user agent string including the value of the power user setting and receiving content over the telecommunications network from the web server in response to the user agent string, the first content differing depending on whether the power user setting assumes the first value or the second value.

A method in accordance with one embodiment of the present teachings for changing an operating mode of an application running on a computing device includes the step of providing an indication to a user of the device of a value of a first power user setting stored in a memory on the device. The first power user setting is capable of assuming one of a plurality of values including a first value indicative of a less experienced user and a second value indicative of a more experienced user. The method further includes the steps of receiving a request from the user of the device to modify the value of the first power user setting and modifying the value of the first power user setting stored in the memory responsive to the request. The method further includes the step of executing a first plurality of executable instructions to implement a first application. The first application is configured to operate in a plurality of operating modes including a first mode in which a reduced functionality is made available to the user of the device if the first power user setting assumes the first value and a second mode in which an increased functionality is made available to the user of the device if the first power user setting assumes the second value. The first plurality of executable instructions includes an instruction to retrieve the value of the first power user setting for use by the first application.

A computing device in accordance with the present teachings is advantageous, for example, because the device enables individual advanced features within applications for power users while preventing confusion for typical users and clutter of the user interface. Of greater significance, the device allows the user and application developers to control access to advanced features as opposed to a third party administrator and does so in a simplified way that avoids the need for the user to provider an indication of his or experience level on an application by application basis.

The foregoing and other aspects, features, details, utilities and advantages of the present teachings will be apparent from reading the following description and claims, and from reviewing the accompanying drawings.

DETAILED DESCRIPTION OF EMBODIMENTS

Figure 1:
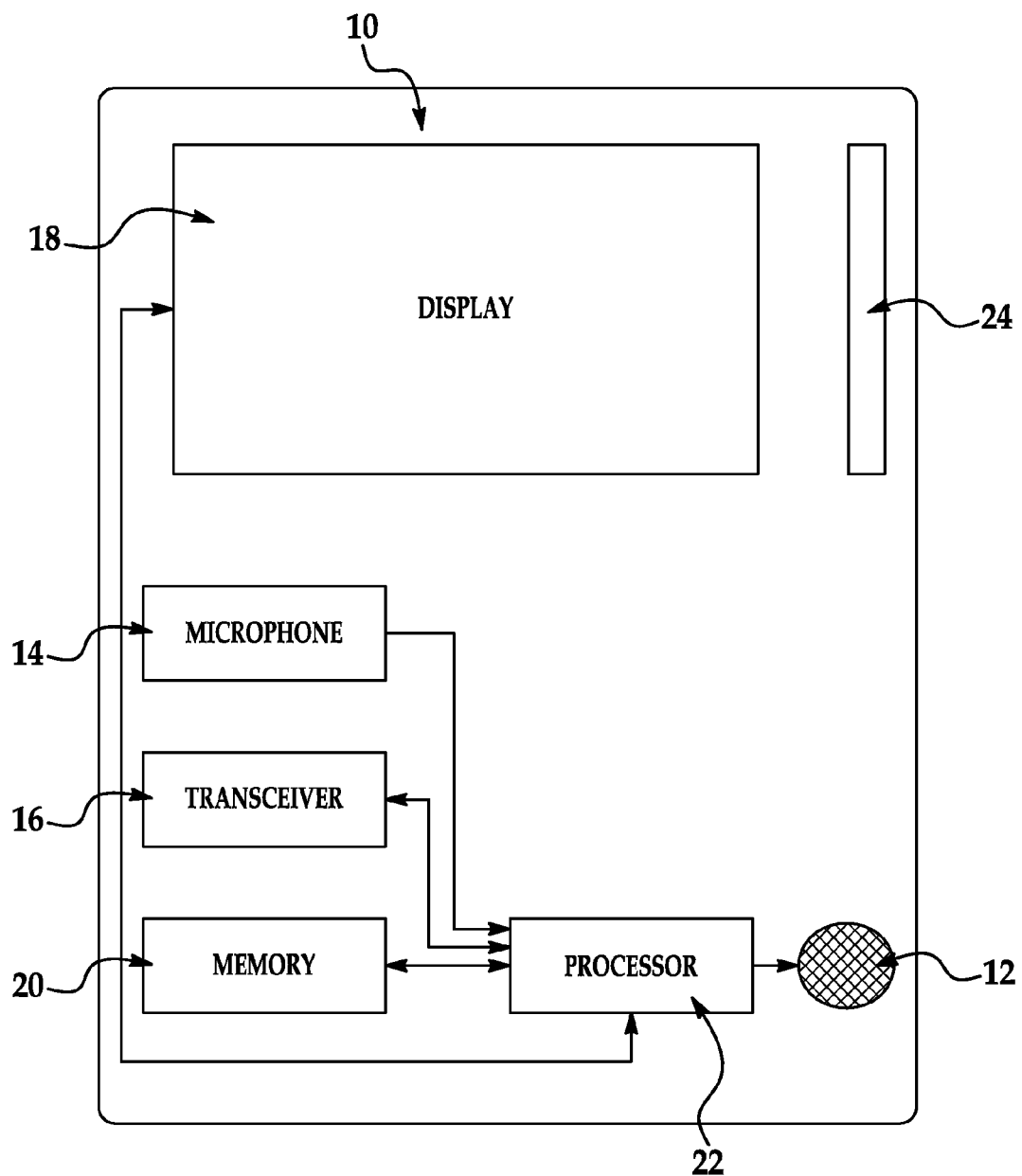
FIG. 1 is a diagrammatic view of a computing device in accordance with one embodiment of the present teachings.

Referring now to the drawings wherein like reference numerals are used to identify identical components in the various views, FIG. 1 illustrates a computing device 10 in accordance with one embodiment of the present teachings. In the illustrated embodiment, device 10 comprises a mobile communication device and, in particular, a cellular phone. It should be understood, however, that device 10 may comprise any of a variety of mobile and/or fixed computing devices including, for example, tablet or laptop computers, desktop computers, vehicle interface systems (such as audio, navigation, and system controls associated with a vehicle), GPS systems, servers and so on, as discussed in greater detail hereinbelow. Device 10 may include cellular phone components including, for example, a speaker 12, a microphone 14, one or more transceivers 16, a display 18, and a memory 20. Although not illustrated, device 10 may further include components such as a battery and power management and signal processing circuitry. In accordance with various embodiments of the present teachings, device 10 may include an electronic control unit or processor 22.

Speaker 12 includes an electric to acoustic transducer that generates sound in response to electrical signals indicative of audio communications. Microphone 14 includes an acoustic to electric transducer that converts sound or mechanical vibration to electrical signals.

Figure 2:
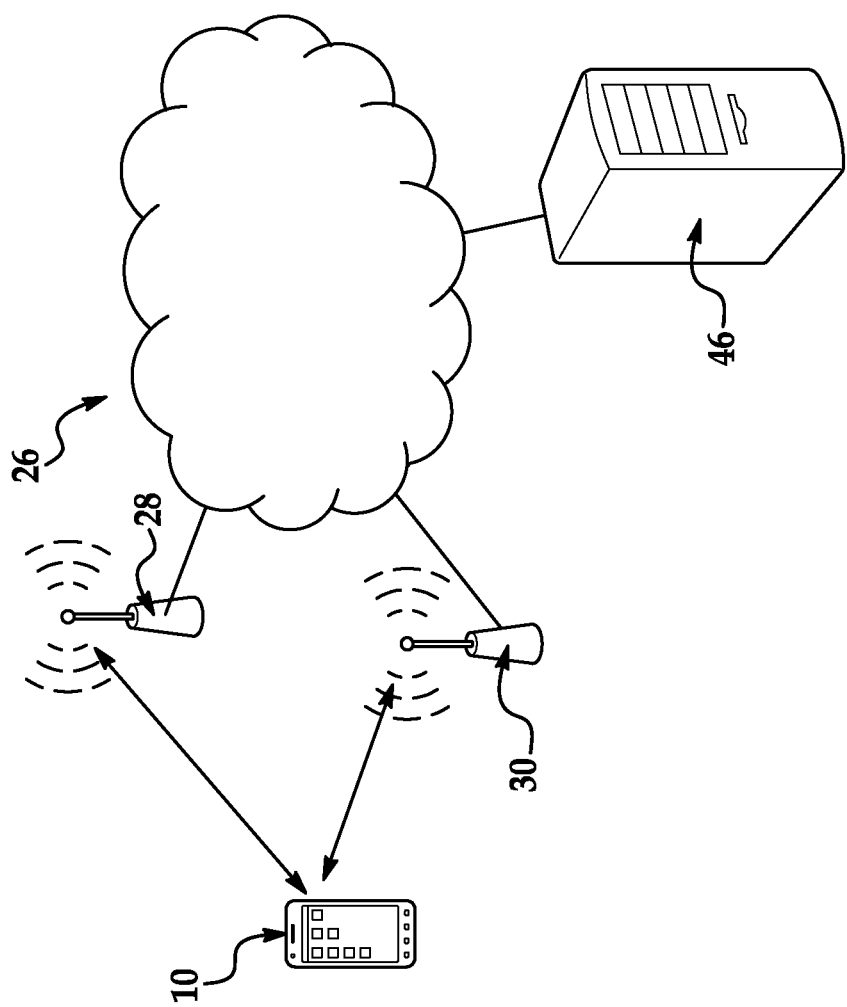
FIG. 2 is a diagrammatic view of the computing device of FIG. 1 illustrating connections to a telecommunications network and a web server.

Transceivers 16 may comprise radio transceivers that transmit signals to and receive signals from an antenna 24 for wireless communication with a telecommunications network or another computing device. Referring to FIG. 2, transceivers 16 may form part of a network interface configured for connection to a telecommunications network 26 such as a cellular telecommunications network made available by a wireless provider and accessible by device 10, and/or the public internet, a local area network (LAN), wide area network (WAN), virtual private network (VPN) or other form of telecommunications network. Device 10 may access the telecommunications network 26 using one or more access points such as cellular base stations 28, 30 which may themselves be connected to a mobile telephone switching center that routes voice and data transmissions between device 10 and telephone landlines and network servers (not shown). Transceivers 16 may communicate with cellular base stations 28, 30 using communication topologies including frequency, time and code division multiple access topologies (i.e., FDMA, TDMA, CDMA). One or more transceivers 16 may also be configured for short range wireless communication using short-range wireless technologies such as Wi-Fi (IEEE 802.11), Bluetooth, Zigbee, NFC (near field communications), etc.

Display 18 functions as an input/output device for the user of device 10. Display 18 may comprise, for example, a liquid crystal display or light emitting diode display. Display 18 provides a graphical user interface (GUI) to the user. Display 18 may function as only an output device with input received through other I/O devices such as a keyboard. Alternatively, display 18 may also function as an input device and may comprise a touch screen display including, for example capacitive and resistive touch screen displays. In accordance with one aspect of the present teachings, display 18 may provide a visual representation of the value of a power user setting indicative of an experience level of a user of the device. The visual representation may, for example, be in the form of alphanumeric characters, an icon, or one or more colors.

Memory 20 is provided for storage of data and instructions or code (i.e. software) for processor 22. Memory 20 may comprise various forms of non-volatile memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that memory 20 may be internal to processor 22.

In accordance with one aspect of the present teachings, memory 20 stores values for one or more power user settings. A power user setting is an indicator of the experience level of a user of device 10. Each power user setting is capable of assuming one of a plurality of values including a value indicative of a less experienced user and a value indicative of a more experienced user. The power user setting may, for example, comprise a binary flag with one value indicating a novice or less experienced user and another value indicating an experienced user. The power user setting may also, however, have more than two values with different values indicating varying levels of experience.

Memory 20 may also store a plurality of executable instructions defining a plurality of applications for device 10. As used herein, an application refers to a software program providing a functional or entertainment value to an end user or enabling the user to perform a task (e.g., a word processing program, a spreadsheet program, a database, an electronic book reader, a video or other media player, a picture viewer, an internet browser, a game, etc.). One or more of the applications may have a plurality of operating modes including one mode in which a reduced functionality is made available to a user of device 10 and another operating mode in which an increased functionality is made available to a user of device 10. As used herein, the terms reduced functionality and increased functionality are relative terms with an operating mode having increased functionality enabling features or functions for the user that are not enabled in an operating mode having reduced functionality. For example, an application comprising a game may have various levels of difficulty with more difficult levels only available in an operating mode having increased functionality. As another example, an application comprising a word processor may have optional functions that are displayed in a menu or other form of interface and/or able to be selected only in an operating mode having increased functionality. As yet another example, an application may have a test or beta version that is enabled only in an operating mode having increased functionality. In general, processor 22 will execute certain executable instructions associated with a given application only in a particular operating mode. In accordance with one embodiment of the present teachings, memory 20 may also include a computer program encoded thereon that when executed by processor 22 causes the processor 22 to change an operating mode of an application on device 10 in response to a power user setting.

Processor 22 is provided to execute program instructions and control components of device 10 to implement various applications. In accordance with the present teachings, processor 22 is also provided to enable modification of one or more power user settings in memory 20 and to provide those settings to applications and other computer devices as discussed in greater detail hereinbelow. Processor 22 may comprise one or more programmable microprocessors or microcontrollers. Processor 22 may include a central processing unit (CPU), memory (such as memory 20) and an input/output (I/O) interface through which processor 22 may receive a plurality of input signals including signals generated by microphone 14, transceivers 16, and display 18 and generate a plurality of output signals including those used to control and/or provide data to speaker 12, transceivers 16, and display 18.

In accordance with one embodiment of the present teachings, processor 22 may be configured with programming instructions from a computer program (i.e., software) to perform all or part of a method for changing an operating mode in an application running on device 10. The program may be stored in a computer storage medium such as memory 20 (which again may be internal to processor 22 or external to processor 22 as illustrated in FIG. 1). The program may be pre-installed in a computer storage medium on device 10 or may be obtained from a computer storage medium external to device 10. For example, processor 22 may download the program from another computing device such as an application server over a telecommunications network such as network 26. As used herein, the term "server" refers to a computing device coupled to a telecommunications network and configured by programming instructions (i.e., software) to provide services to other computing devices (including other servers). The server may include an operating system such as one of the operating systems based on the Linux or UNIX operating systems. The server may also include an internal memory or database that may employ a database management system (DBMS) and may be configured to provide a static and dynamic contact structure for the server and used to provide both intermediate information while the server executes operations and long-term storage of data. The server may further include applications that configure the server to perform specific functions based on the intended user of the server. The applications may be implemented using software development components and may further include a combination of JavaScript, VB Script and ASP (Active Server Pages) and other software components to provide required functionality. The server may also include an interface to provide a graphical and communications interface between the server and clients such as device 10. The interface may, for example, be configured to be eXtensible Markup Language (XML) or Simple Object Access Protocol (SOAP) compliant.

Figure 3:
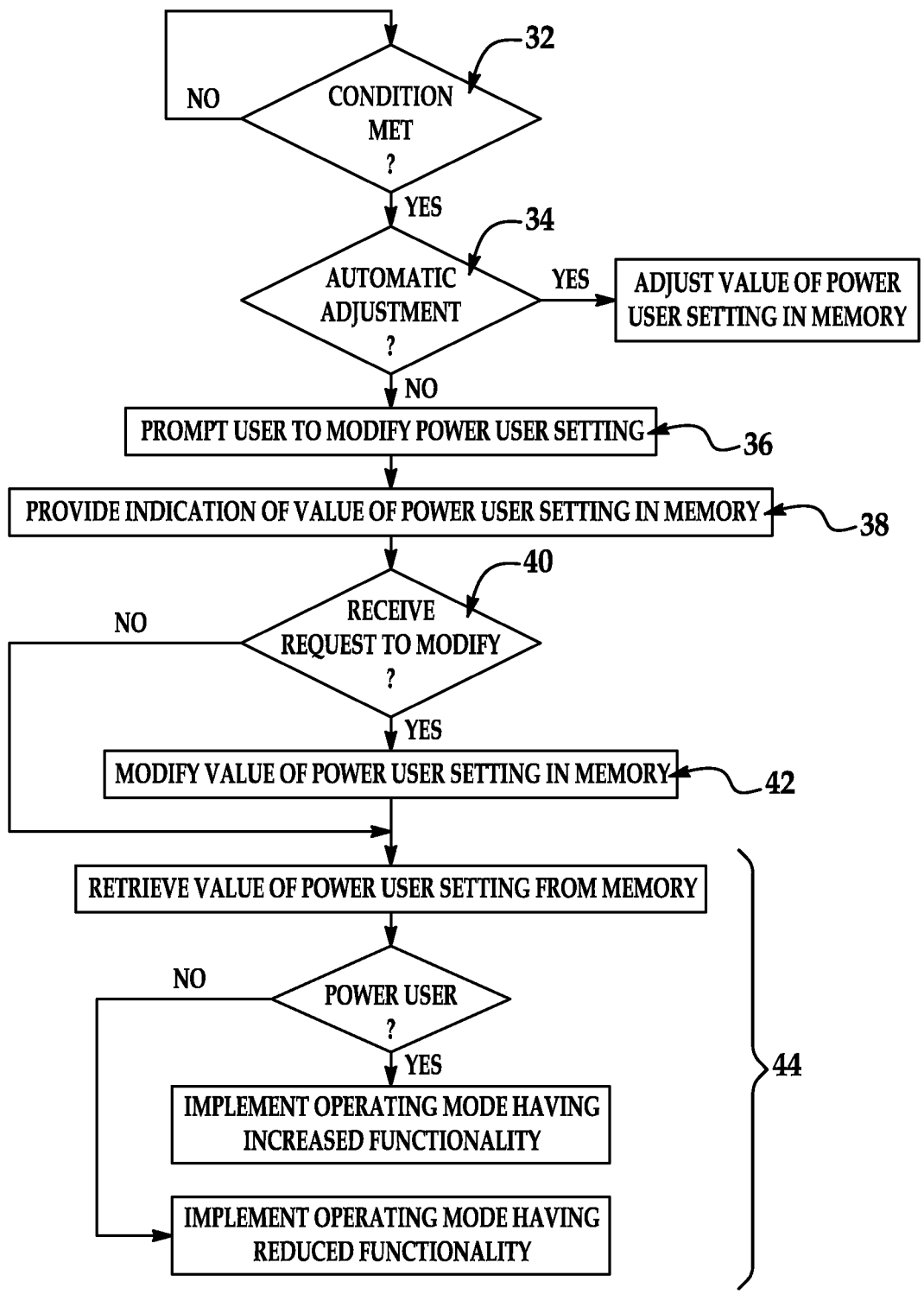
FIG. 3 is a flowchart illustrating one embodiment of a process for changing an operating mode of an application on the device of FIG. 1 in accordance with one embodiment of the present teachings.

Referring now to FIG. 3, the operation of processor 22 and device 10 in accordance with one embodiment of the present teachings is illustrated. Device 10 may begin with the processes 32, 34 of determining whether a predetermined condition has been met and adjusting the value of a power user setting if the condition has been met. In certain circumstances, it may be desirable to adjust the power user setting automatically (i.e., without user input) if a predetermined condition is met. For example, the condition may comprise the passage of a predetermined time period such that the power user setting is adjusted to a value indicative of a more experienced user once a time period has passed based on use of the device or a particular application or function. In another example, the condition may comprise the number of times the device or an application or function is used or may comprise the performance of one or more functions or combination of functions by the user that is indicative of an experienced user. The decision whether to automatically adjust a power user setting may itself be made based on one or more predetermined conditions including, for example, whether a flag in memory 20 has a predetermined value (which may be set by the user or by program instruction).

Assuming that automatic adjustment of a power user setting does not occur, device 10 may continue with the process 36 of prompting the user of device 10 to modify the value of the first power user setting. The same type of predetermined conditions that can result in automatic adjustment can be used to prompt the user of device 10 to modify a power user setting. The prompt may comprise a visual representation on display 18 such as a textual notice to the user to consider modifying a particular power user setting to achieve increased functionality in device 10 or an application running on device 10. Device 10 may further perform the process 38 of providing an indication to a user of device 10 of the value of a power user setting stored in memory 20. As noted hereinabove, the indication may comprise a visual representation of the value of the power user setting on display 18 such as alphanumeric characters, an icon, or one or more colors.

Processor 22 may be further configured to perform the processes 40, 42 of receiving a request from a user of device 10 to modify the value of a power user setting and modifying the value of the power user setting in memory 20 responsive to the request. A user may submit a request using various input devices including through a graphical user interface on display 18. If a request to modify a power user setting is received, processor 30 may modify the existing value for the setting in memory 20 by overwriting the existing value and storing the new value in memory 20.

Processor 22 may be further configured to perform the process 44 of executing a plurality of executable instructions to implement an application. Those instructions may include an instruction to retrieve the value of a power user setting from memory 20 for use by the application. Application developers may include program instructions that retrieve the power user setting and use that setting to adjust the operating mode of the program. As described hereinabove, an application may have a plurality of operating modes including a mode in which a reduced functionality is made available to the user of device 10 and a mode in which an increased functionality is made available to the user of device 10. Processor 22 will execute different sets of instructions to implement different operating modes of the application based on the power user setting.

As noted above, memory 20 may include a plurality of power user settings. Different power user settings may be used to adjust between different groups of operating modes in a single application or may be used to adjust between different groups of operating modes in multiple applications. Therefore, in one embodiment, processor 22 may execute another instruction within the same application to retrieve an additional power user setting stored in memory 20 for use by the application. The additional power user setting may again be capable of assuming one of a plurality of values including a value indicative of a less experienced user and a value indicative of a more experienced user. The application may be configured to operate in one operating mode in which a reduced functionality is made available to the user of device 10 if the additional power user setting assumes a value indicative of a less experienced user and another operating mode in which increased functionality is made available to the user if the additional power user setting assumes the value indicative of a more experienced user. In another embodiment, processor 22 may execute an additional plurality of instructions to implement a different application. The additional instructions may again include an instruction to retrieve the value of a power user setting stored in memory 20 for use by the additional application. The power user setting may be the same power user setting used for other applications (e.g., a common power user setting may be used for multiple gaming applications indicating the user is an experienced game player) or may be a power user setting specific to the application. The additional application is again configured to operate in a plurality of operating modes including one mode in which a reduced functionality is made available to the user of device 10 if the power user setting assumes the value indicative of a less experienced user and another operating mode in which an increased functionality is made available to the user if the power user setting assumes a value indicative of a more experienced user.

In the illustrated embodiment, device 10 comprises a mobile communication device and, in particular, a cellular phone. As noted above, however, device 10 could comprise a variety of different computing devices. Referring to FIG. 2, in accordance with one embodiment, a web server 46 may implement the above-described method for changing an operating mode in an application running on web server 46. Web server 46 may be in communication with other computer devices such as device 10 across telecommunications network 26. Web server 46 may likewise include a memory and a processor similar to those described hereinabove and may be configured to offer a plurality of applications or services such an electronic mail application, a word processing application, or the provision of information such as maps, or news, or videos. A user may access web server 46 using a client device such as device 10. Web server 46 may implement process 38, for example, by transmitting the value of the power user setting to device 10 across telecommunications network 26 and process 40 by receiving a request to modify the value of the power user setting from device 10 across telecommunications network 26. Web server 46 may then modify the value of the power user setting in a memory associated with web server 46 and a processor associated with web server 46 may execute a plurality of executable instructions associated with an application in which one of the instructions is to retrieve the value of the power user setting from the memory for use by the application. In this manner, applications running on web server 46 may operate in a plurality of operating modes including one mode in which a reduced functionality is made available to the user if the power user setting assumes a value indicative of a less experienced user and another operating mode in which an increased functionality is made available to the user if the power user setting assumes a value indicative of a more experienced user.

Figure 4:
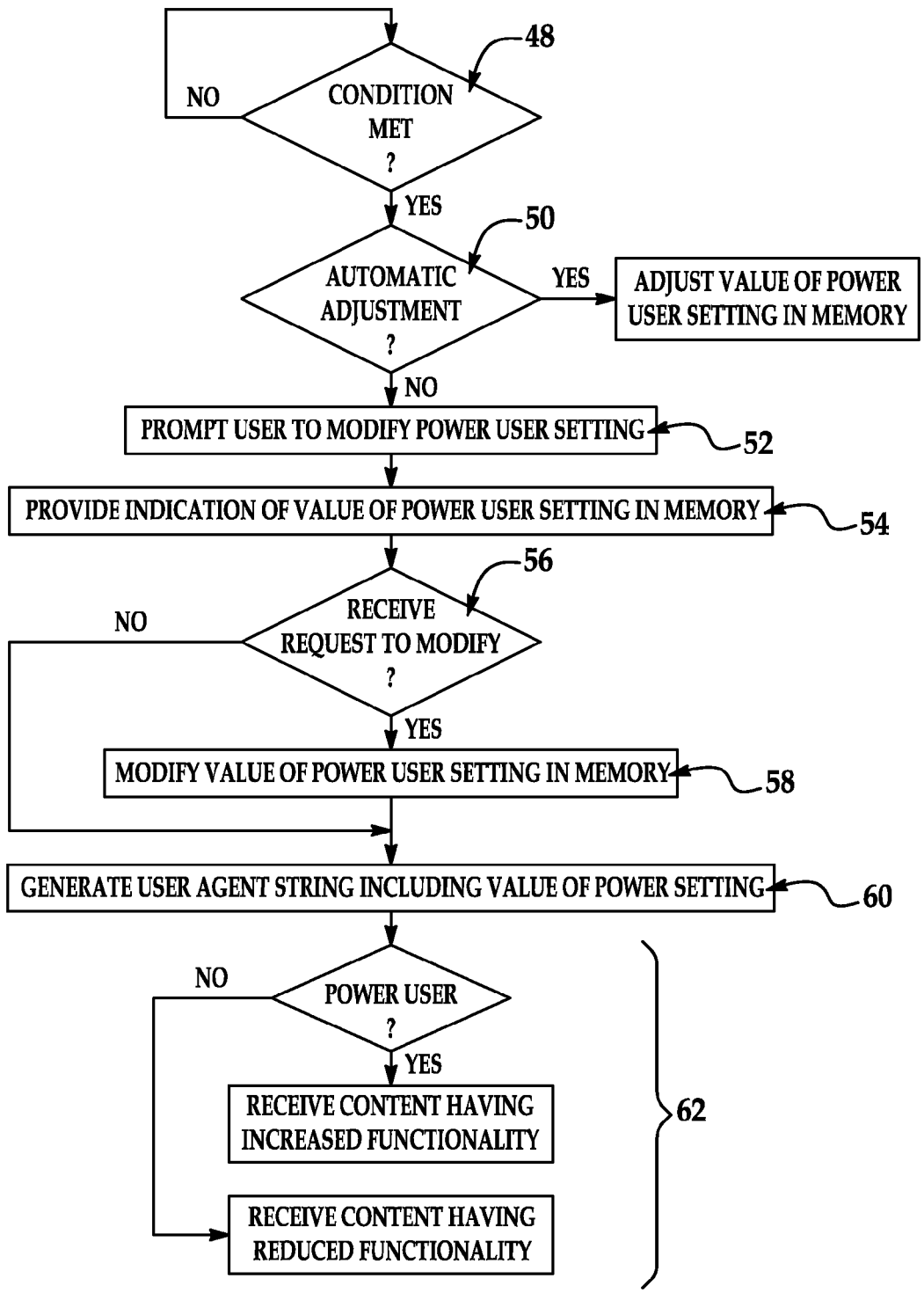
FIG. 4 is a flowchart illustrating one embodiment of a process for enabling variation in delivery of content from a web server to a computing device over a telecommunications network using a power user setting in accordance with one embodiment of the present teachings.

Referring now to FIG. 4, in accordance with another embodiment of the present teachings, processor 22 may be configured with programming instructions from a computer program (i.e., software) to perform all or part of a method for enabling variation in delivery of content from a web server 46 to a computing device such as device 10 over a telecommunications network 26. The program may again be stored in a computer storage medium such as memory 20 (which again may be internal to processor 22 or external to processor 22 as illustrated in FIG. 1). The program may be pre-installed in a computer storage medium on device 10 or may be obtained from a computer storage medium external to device 10. For example, processor 22 may download the program from another computing device such as an application server over a telecommunications network such as network 26.

Processor 22 may be configured to perform processes 48, 50, 52, 54, 56, 58 which are substantially similar to processes 32, 34, 36, 38, 40, 42 described hereinabove. Processor 22 may be further configured to perform a process 60 generating a user agent string including the value of the power user setting. The user agent string may be generated by a user agent such as a web browser and may identify the web browser program (and version of the program) being used among other information. The user agent string may be provided to web server 46 over telecommunications network 26. Processor 22 may be further configured to perform the process 62 of receiving content over telecommunications network 26 from web server 46 in response to the user agent string. The content will differ depending on the value of the power user setting. Again, the content may include additional features or functions if the power user setting has a value indicative of a more experienced user. The type of additional features or functions will vary depending on the type of content delivered. For example, if the content includes information for solving a technical problem with device 10, the content may include information that is more technically complex if the power user setting indicates the user is an experienced user. If the content includes an electronic mail application, additional features may be enabled if the power user setting indicates the user is an experienced user.

A computing device 10 in accordance with the present teachings is advantageous, for example, because the device enables individual advanced features within applications for power users while preventing confusion for typical users and clutter of the user interface. Further, the device allows the user and application developers to control access to advanced features as opposed to a third party administrator and does so in a simplified way that avoids the need for the user to provider an indication of his or experience level on an application by application basis. A user of device 10 may adjust one or more power user settings accessible by applications and application developers can perform simple calls to retrieve the power user setting to alter the operating mode of applications.

Although one or more particular embodiments been shown and described, it will be understood by those of skill in the art that various changes and modifications can be made without departing from the spirit and scope of the present teachings.

What is claimed is:
1. A computing device, comprising:
 a memory configured to store a value for a power user setting that is accessible by and common to applications stored on the computing device so as to configure operating modes of the applications to be at a same level of operating mode, wherein the power user setting includes a first power user setting capable of assuming one of a plurality of values including a first value indicative of a less experienced user and a second value indicative of a more experienced user;
a processor configured to:
provide an indication of the value of the first power user setting stored in the memory;
receive a request to modify the value of the first power user setting,
modify the value of the first power user setting stored in the memory responsive to the request; and,
execute a first plurality of executable instructions to implement a first application, the first application configured to operate in a plurality of operating modes including a first mode in which a reduced functionality is made available if the first power user setting assumes the first value and a second mode in which an increased functionality is made available if the first power user setting assumes the second value, the first plurality of executable instructions including an instruction to retrieve the value of the first power user setting for use by the first application.

2. The computing device of claim 1 wherein the device comprises a web server.

3. The computing device of claim 1 wherein the indication includes a visual representation of the value of the first power user setting on a display.

4. The computing device of claim 1 wherein the first plurality of executable instructions includes an instruction to retrieve a value of a second power user setting stored in the memory for use by the first application, the second power user setting capable of assuming one of a plurality of values including a first value indicative of a less experienced user and a second value indicative of a more experienced user and the first application configured to operate in a third mode in which a reduced functionality is made available if the second power user setting assumes the first value for the second power user setting and a fourth operating mode in which an increased functionality is made available if the second power user setting assumes the second value for the second power user setting.

5. The computing device of claim 1 wherein the processor is further configured to execute a second plurality of executable instructions to implement a second application, the second plurality of instructions including an instruction to retrieve the value of a second power user setting stored in the memory for use by the second application, the second power user setting capable of assuming one of a plurality of values including a first value indicative of a less experienced user and a second value indicative of a more experienced user and the second application configured to operate in a first mode in which a reduced functionality is made available if the second power user setting assumes the first value for the second power user setting and a second operating mode in which an increased functionality is made available if the second power user setting assumes the second value for the second power user setting.

6. The computing device of claim 1 wherein the increased functionality includes enabling a test version of the first application.

7. The computing device of claim 1 wherein the processor executes a second plurality of executable instructions associated with the first application only in the second mode.

8. The computing device of claim 1 wherein the processor is further configured to adjust the value of the first power user setting when a predetermined condition is met.

9. The computing device of claim 8 wherein the predetermined condition is the passage of a predetermined period of time.

10. The computing device of claim 1 wherein the processor is further configured to provide a prompt to modify the value of the first power user setting when a predetermined condition is met.

11. An article of manufacture, comprising:
a non-transitory computer readable storage medium having a computer program encoded thereon that when executed by a processor of a computing device causes the processor to change an operating mode of a first application, the computer program including code for:
storing a value for a power user setting that is accessible by and common to applications stored on the computing device so as to configure operating modes of the applications to be at a same level of operating mode, wherein the power user setting includes a first power user setting capable of assuming one of a plurality of values including a first value indicative of a less experienced user and a second value indicative of a more experienced user;
providing an indication of the value of the first power user setting stored in the memory;
receiving a request to modify the value of the first power user setting,
modifying the value of the first power user setting stored in the memory responsive to the request; and,
retrieving the value of the first power user setting from the memory for use by the first application, the first application configured to operate in a plurality of operating modes including a first mode in which a reduced functionality is made available if the first power user setting assumes the first value and a second mode in which an increased functionality is made available if the first power user setting assumes the second value.

12. The article of manufacture of claim 11 wherein the computer program further includes code for adjusting the value of the first power user setting when a predetermined condition is met.

13. An article of manufacture, comprising:
a non-transitory computer readable storage medium having a computer program encoded thereon when executed by a processor of a computing device causes the processor to enable variation in delivery of content from a web server to the computing device over a telecommunications network, the computer program including code for:
storing in a memory a value for a power user setting that is accessible by and common to applications stored on the computing device so as to configure operating modes of the applications to be at a same level of operating mode, wherein the power user setting includes a first power user setting capable of assuming one of a plurality of values including a first value indicative of a less experienced user and a second value indicative of a more experienced user;
providing an indication of a value of the first power user setting stored in the memory;
receiving a request to modify the value of the first power user setting;
modifying the value of the first power user setting stored in the memory responsive to the request;
generating a user agent string including the value of the first power user setting; and, receiving first content over the telecommunications network from the web server in response to the user agent string, the first content differing depending on whether the first power user setting assumes the first value or the second value.

14. The article of manufacture of claim 13 wherein the device comprises a mobile communication device.

15. The article of manufacture of claim 13 wherein the indication includes a visual representation of the value of the power user setting on a display of the device.

16. The article of manufacture of claim 13 wherein the user agent string further includes a value of a second power user setting, the second power user setting capable of assuming one of a plurality of values including a first value indicative of a less experienced user and a second value indicative of a more experienced user and wherein the computer program includes code for receiving second content over the telecommunications network from the web server in response to the user agent string, the second content differing depending on whether the second power user setting assumes the first value for the second power user setting or the second value for the second power user setting.

17. The article of manufacture of claim 13 wherein the computer program includes code for adjusting the value of the first power user setting when a predetermined condition is met.

18. The article of manufacture of claim 17 wherein the predetermined condition is the passage of a predetermined period of time.

19. The article of manufacture of claim 13 wherein the computer program includes code for providing a prompt to modify the value of the first power user setting when a predetermined condition is met.

20. A method for changing an operating mode of an application running on a computing device, comprising the steps of:
storing in a memory on the computing device a value for a power user setting that is accessible by and common to applications stored on the computing device so as to configure operating modes of the applications to be at a same level of operating mode, wherein the power user setting includes a first power user setting capable of assuming one of a plurality of values including a first value indicative of a less experienced user and a second value indicative of a more experienced user;
providing an indication of a value of the first power user setting stored in the memory on the computing device;
receiving a request to modify the value of the first power user setting,
modifying the value of the first power user setting stored in the memory responsive to the request; and,
executing a first plurality of executable instructions to implement a first application, the first application configured to operate in a plurality of operating modes including a first mode in which a reduced functionality is made available if the first power user setting assumes the first value and a second mode in which an increased functionality is made available if the first power user setting assumes the second value, the first plurality of executable instructions including an instruction to retrieve the value of the first power user setting for use by the first application.

21. The method of claim 20 wherein the device comprises a mobile communication device.

22. The method of claim 20 wherein the device comprises a web server.

23. The method of claim 20 wherein the first plurality of executable instructions include an instruction to retrieve a value of a second power user setting stored in the memory for use by the first application, the second power user setting capable of assuming one of a plurality of values including a first value indicative of a less experienced user and a second value indicative of a more experienced user and the first application configured to operate in a third mode in which a reduced functionality is made available if the second power user setting assumes the first value for the second power user setting and a fourth operating mode in which an increased functionality is made available if the second power user setting assumes the second value for the second power user setting.

24. The method of claim 20 further comprising the step of executing a second plurality of executable instructions to implement a second application, the second plurality of instructions including an instruction to retrieve the value of a second power user setting stored in the memory for use by the second application, the second power user setting capable of assuming one of a plurality of values including a first value indicative of a less experienced user and a second value indicative of a more experienced user and the second application configured to operate in a first mode in which a reduced functionality is made available if the second power user setting assumes the first value for the second power user setting and a second operating mode in which an increased functionality is made available if the second power user setting assumes the second value for the second power user setting.

25. The method of claim 20 wherein the increased functionality includes enabling a test version of the first application.

26. The method of claim 20 further comprising the step of executing a second plurality of executable instructions associated with the first application only in the second mode.

27. The method of claim 20 further comprising the step of adjusting the value of the first power user setting when a predetermined condition is met.

28. The method of claim 27 wherein the predetermined condition is the passage of a predetermined period of time.

29. The method of claim 20 further comprising the step of providing a prompt to modify the value of the first power user setting when a predetermined condition is met.

* * * * *